United States Patent [19]

Moulder

[11] Patent Number: 5,352,298

[45] Date of Patent: Oct. 4, 1994

[54] TANK CAR CLEANING AND STRIPPING APPARATUS AND METHOD

[76] Inventor: Jeffrey E. Moulder, P.O. Box 1104, New Caney, Tex. 77357

[21] Appl. No.: 53,726

[22] Filed: Apr. 27, 1993

[51] Int. Cl.$^5$ .............. B08B 3/02; B08B 9/08
[52] U.S. Cl. ................ 134/22.18; 118/306; 134/24; 134/168 R; 239/227; 239/265
[58] Field of Search ............ 134/22.18, 24, 167 R, 134/167 C, 168 R, 168 C; 118/306, 317, DIG. 10; 239/227, 265

[56] References Cited

U.S. PATENT DOCUMENTS

| | | | |
|---|---|---|---|
| 1,628,141 | 5/1927 | Gray | 134/168 R X |
| 3,001,534 | 9/1961 | Grant | 134/167 |
| 3,444,869 | 5/1969 | Guignon et al. | 134/167 |
| 3,461,889 | 8/1969 | Saxonmeyer | 134/43 |
| 3,477,178 | 11/1969 | Hulbert | 51/8 |
| 3,487,841 | 1/1970 | Goodrum | 134/167 R |
| 3,571,985 | 3/1971 | Hulbert | 51/319 |
| 3,696,825 | 10/1972 | Guignon et al. | 134/167 R |
| 3,825,022 | 7/1974 | Metz | 134/167 R X |
| 3,895,756 | 7/1975 | Jaeger | 239/227 |
| 3,973,988 | 8/1976 | McMahan | 134/168 R X |
| 4,064,656 | 12/1977 | Zeidler | 51/426 |
| 4,149,345 | 4/1979 | Atsuchi | 51/424 |
| 4,170,192 | 10/1979 | Maddock | 118/306 |
| 4,244,523 | 1/1981 | Looper | 239/227 |
| 4,309,958 | 1/1982 | Jennings | 118/306 |
| 4,341,232 | 7/1982 | Maton | 134/107 |
| 4,938,167 | 7/1990 | Mizuho et al. | 118/317 X |

Primary Examiner—Philip R. Coe
Attorney, Agent, or Firm—Harrison & Egbert

[57] ABSTRACT

An improved apparatus and method for cleaning and stripping residue, contaminants, debris. etc. from all of the interior spaces in a railway tank car and the like. The present invention may be conveniently lowered into a tank car through its manway and, after quick assembly thereof, pneumatically configured to accommodate the physical dimensions of the tank car, and then be preset for automatic cleaning and/or stripping operation. A means is provided which inherently coordinates and synchronizes the cleaning and stripping of virtually every internal surface contained in a tank car. The preferred embodiment comprises a X-frame assembly having a pair of corresponding X-members which are attached by an axle disposed therebetween. Pivotally attached to this X-fame assembly is a swivel support assembly which receives a K-frame assembly comprising a plurality of arm means, linkage means and spray means spraying all of the interior surfaces of a tank car.

18 Claims, 12 Drawing Sheets

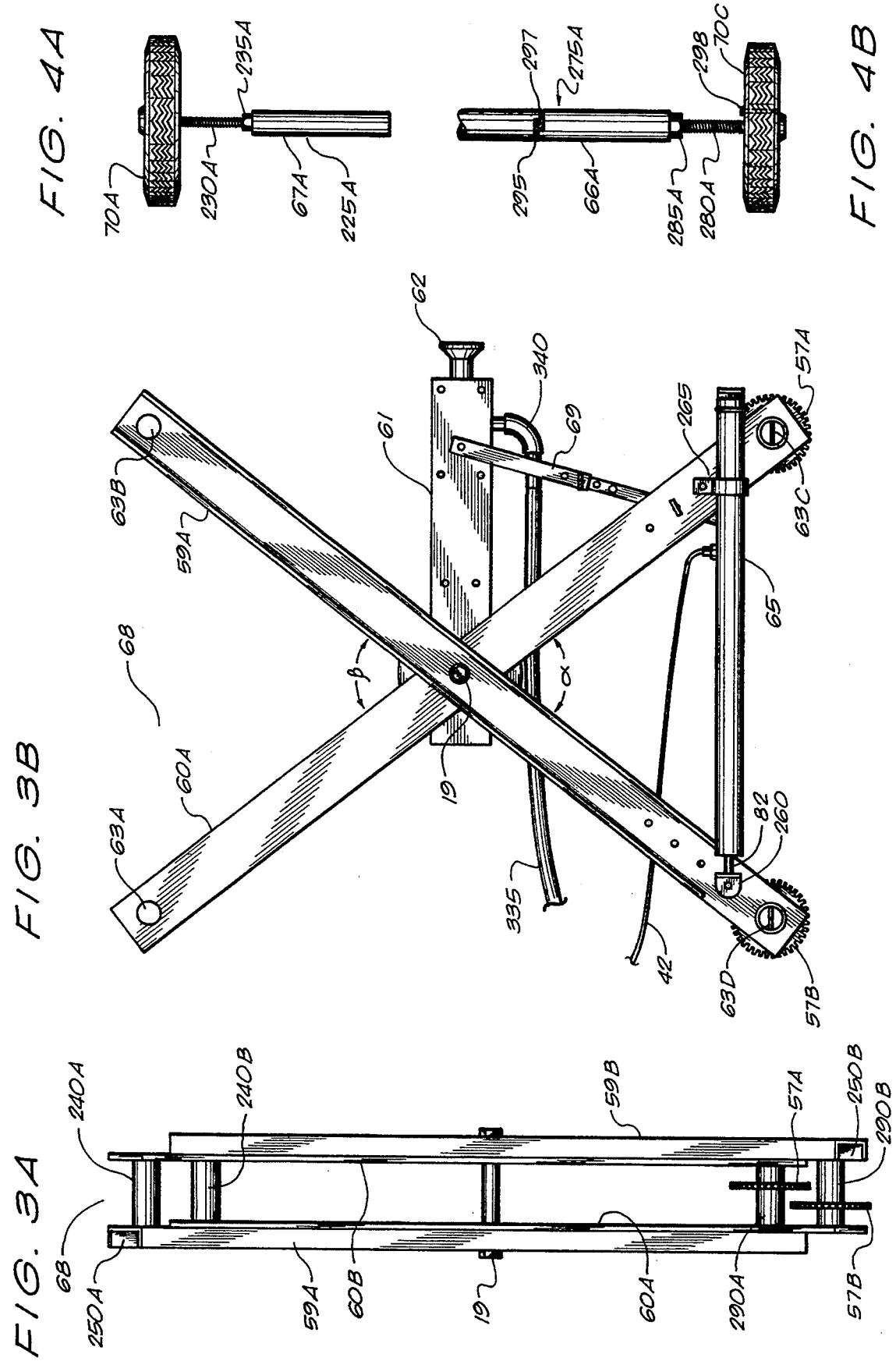

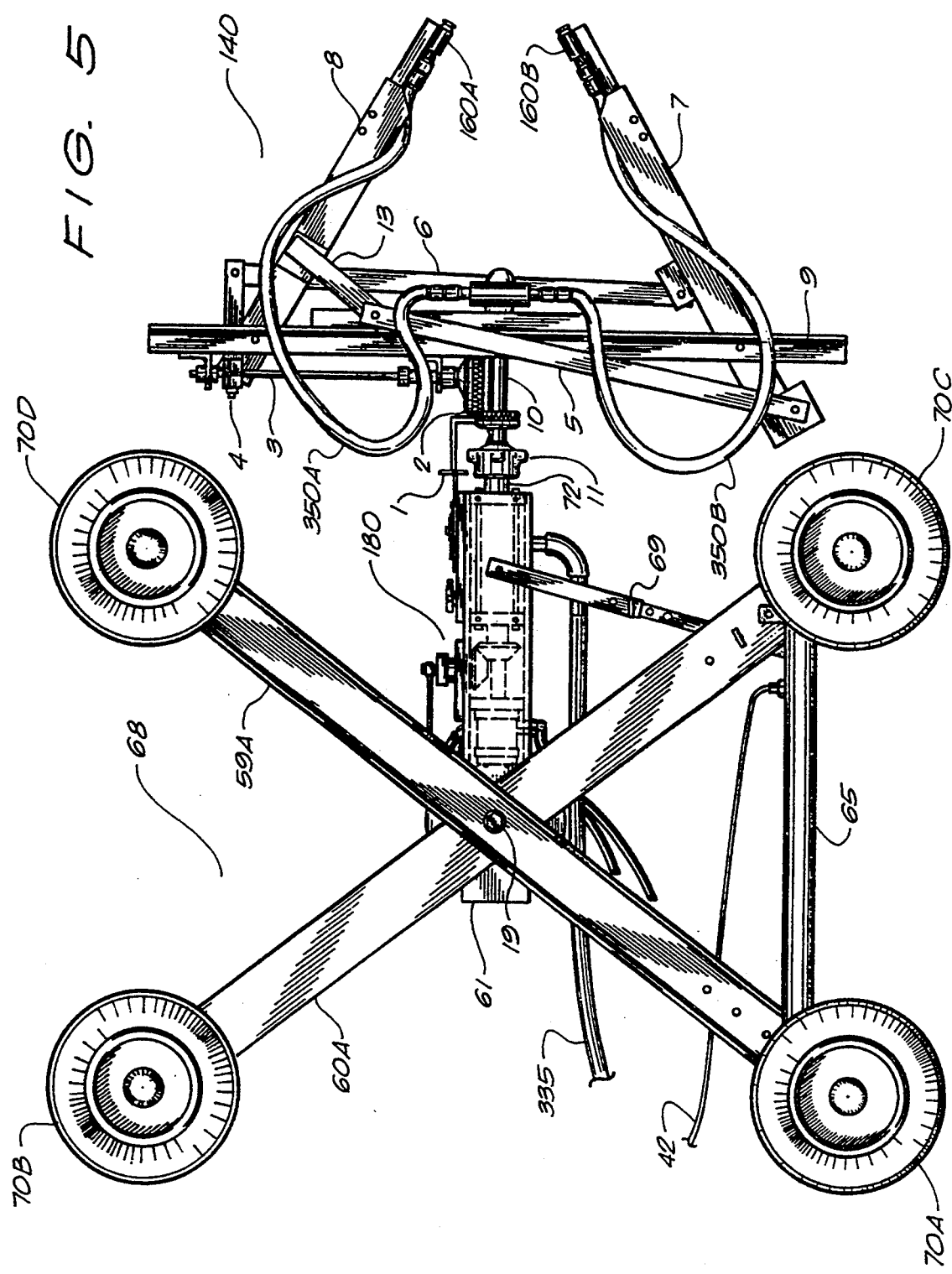

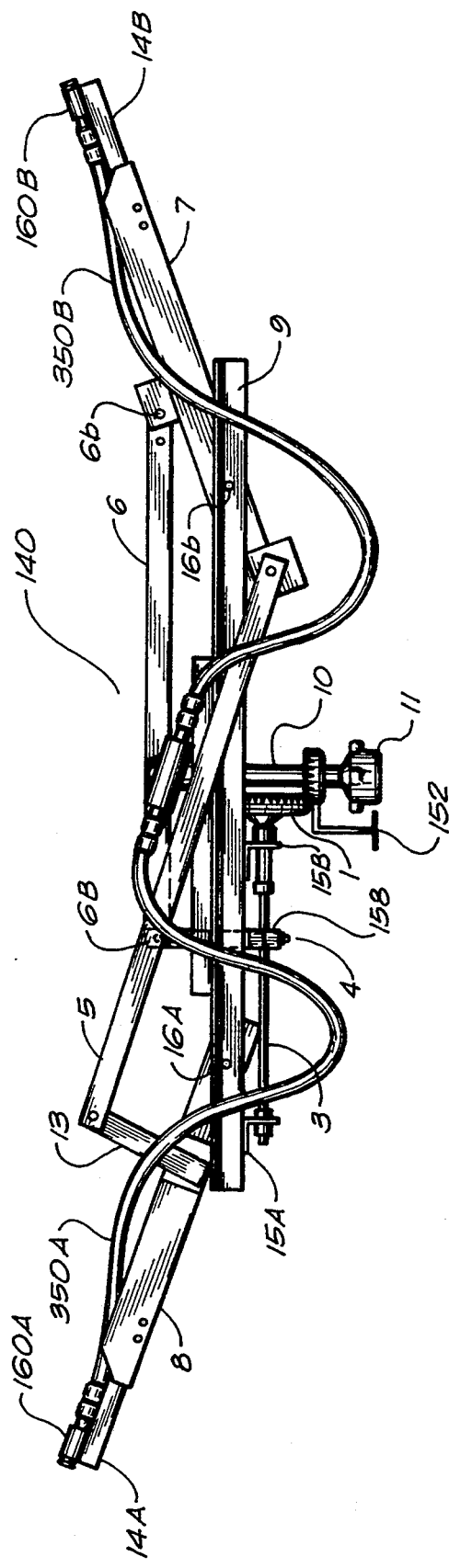

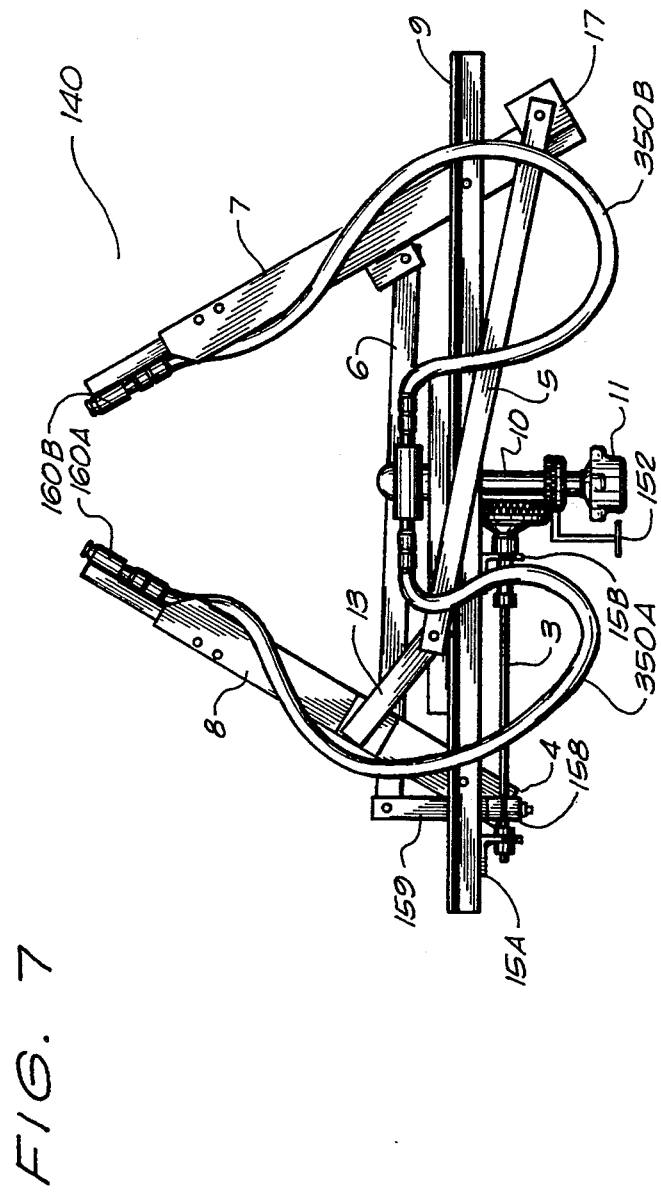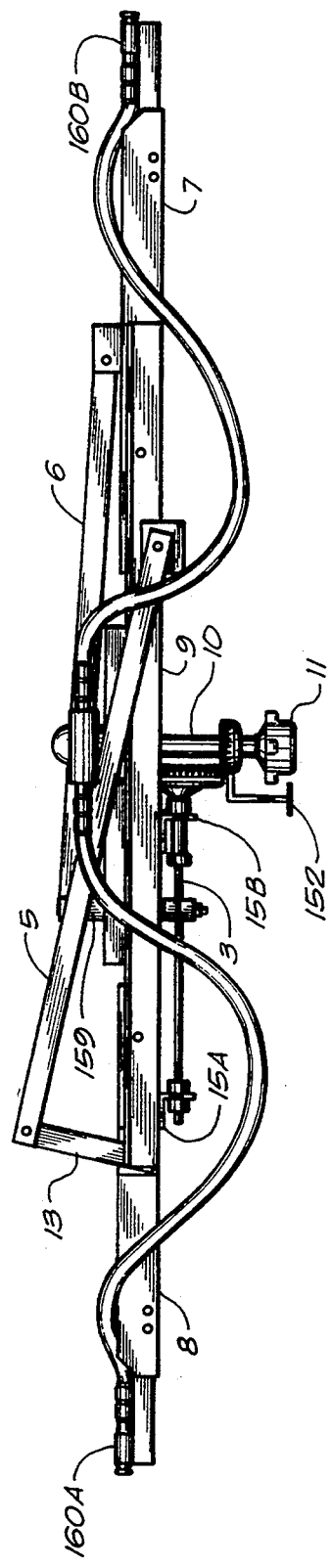
FIG. 7
FIG. 8

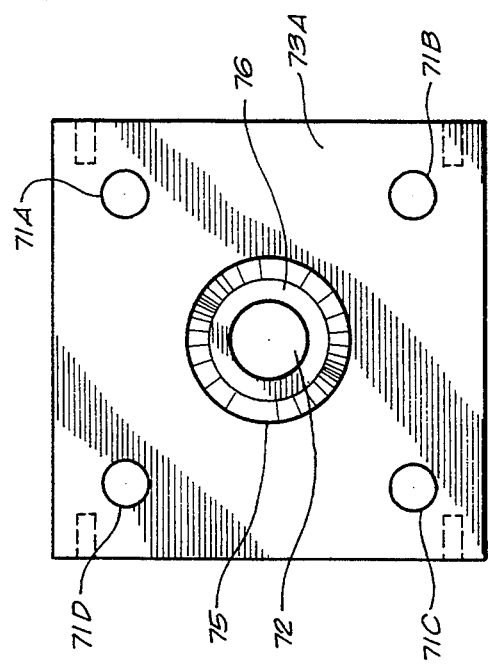
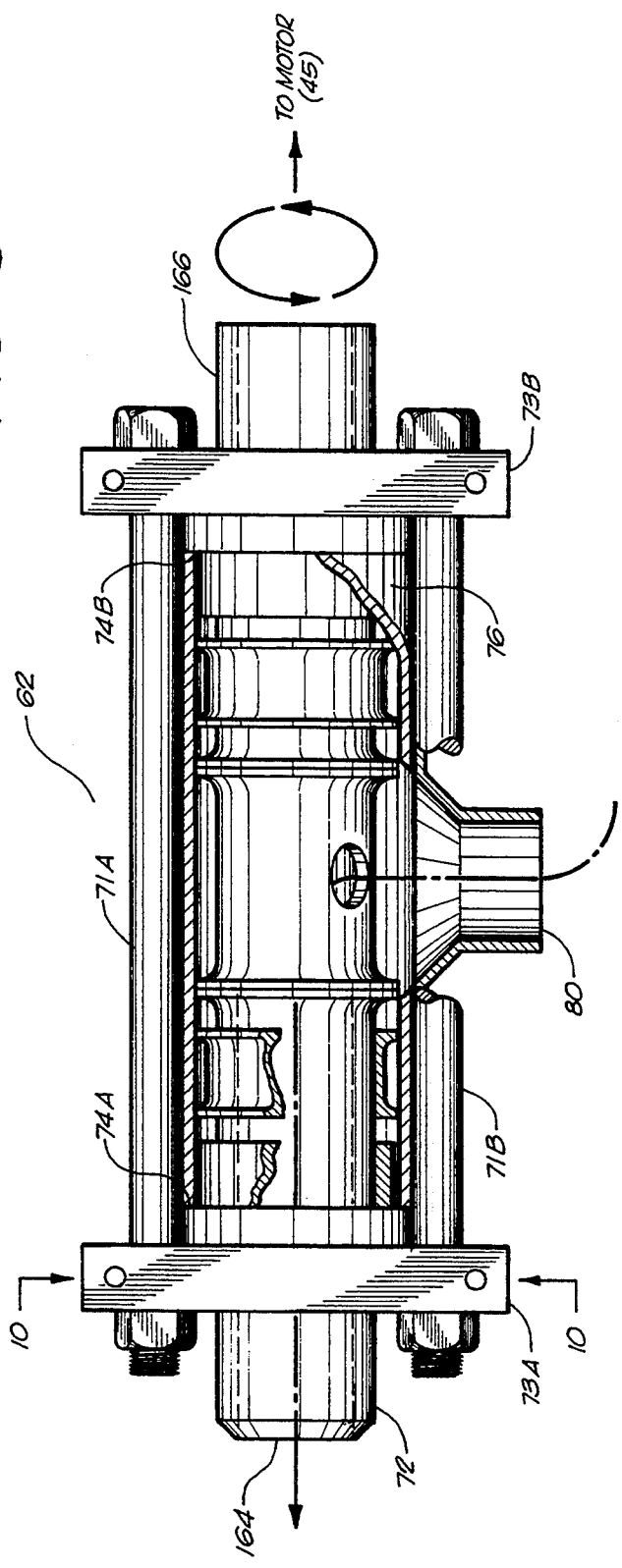

TANK CAR CLEANING AND STRIPPING APPARATUS AND METHOD

BACKGROUND OF THE INVENTION

This invention relates to cleaning methods and apparatus, and more particularly relates to methods and means for cleaning interior surfaces of railroad tank cars and the like, and also stripping rubber linings and the like affixed to these interior surfaces.

It is well known in the prior art that a diversity of commodities are transported by land in railroad tank cars, truck trailers, transport tankers, etc. It is also well known in the prior art that there are special purpose railroad tank cars and the like which are lined with rubber and the like, to prevent contamination, chemical reactions, etc.

Prior to being filled or loaded with a particular commodity, a tank car and the like must be thoroughly cleaned for health and safety reasons. Tank cars with linings must, of course, also be cleaned and, indeed, such linings may be stripped and replaced prior to being filled or loaded with another commodity. Such cleaning and stripping have heretofore conventionally been both labor-intensive and time-consuming.

During typical manual cleaning, the flow of liquid through hand-held hoses is limited to volumes of less than approximately 7 gallons per minute. This throughput is not only limited by a worker's handling ability, but also is limited by the unstable standing conditions in a slippery, conventional rounded-bottom tank car. Indeed, considering that typical manual car-wash volumes of water are only 2 gallons per minute at low pressures of 1,500 psi, a 7 gallon per minute flow presents a considerable challenge to a worker, particularly within the confines of a tank car and the like. Furthermore, there are hazards to workmen from splashing chemicals, debris, fumes, and even explosions. Thus, in addition to being an inherently hazardous and slow method of cleaning tank cars, such manual methods are inherently nonuniform and unreliable.

Accordingly, there have been several attempts in the art to automate the cleaning and stripping of tank cars and the like. To clean the interior of a tank car with reduced human intervention. However, requires that a suitable apparatus either be a permanent member thereof or be inserted and then assembled therein. As should be evident to those conversant with the art, entry into a railroad tank car is routinely available through a narrow manway located on top thereof or could be rendered expedient through a specially designed wall or side panel or door. But, of course, a tank car with such a specially designed panel or door would necessitate structural modifications and would be susceptible to contamination and leakage.

An apparatus designed to eliminate or minimize such danger to workmen is illustrated by Hulbert in U.S. Pat. No. 3,571,985. Specifically intended to clean tank car linings with an abrasive material like sand, Hulbert discloses an apparatus consisting of a support structure affixed to the ends of a tank car using hydraulics and pneumatics. A pneumatic pump provides for longitudinal movement of a carnage along the support structure, while another pneumatic pump simultaneously provides for independent rotational movement of a plurality of nozzles. Drive means are also provided for the manual control of linear carriage advancement and rotational nozzle spray pattern. A vacuum pump removes debris from the floor of the tank car. Since considerable time appears to be prerequisite to assembling the Hulbert apparatus, it is probably intended not to be portable, but to be a relatively permanent fixture in a tank car.

As another example, Saxonmeyer, in U.S. Pat. No. 3,461,889, teaches an apparatus for washing railway tank car interiors which provides for the entry through a side door in the tank car of a platform movably mounted by a base and a carriage movably mounted with respect to the platform. A boom assembly mounted on the carriage controls the spray of liquid about a vertical axis through plurality of nozzles. The Saxonmeyer apparatus includes sensing axis to provide semi-automatic operation by limiting its washing operation only to times when a side edge of the tank car door opening is not contacted.

While improving the prior railway tank car cleaning art, the Hulbert and Saxonmeyer devices have provided only limited arcuate manipulation of the spray nozzles and require structural modifications to a railroad tank car. Guigon et al., in U.S. Pat. No. 3,444,869, disclose a jet cleaning device which attempts to improve the effectiveness and nature of the spray for cleaning purposes. Based upon a complicated plurality of oscillatable nozzles, this device has a corresponding plurality of streams of cleaning liquid which is directed to the internal surfaces of a tank car. The sizes of these streams depends upon the distances of the plurality of nozzles from tile internal surfaces therefrom.

Another improvement in the nozzle manipulation art is disclosed by Jaeger in U.S. Pat. No. 3,895.756. In particular, there is disclosed a method and apparatus for cleaning vessels which not only enables presetting control means to accommodate a vessel's dimensions, but also enables programming a sequence of nozzle movements. The Jaeger apparatus is lowered into a tank car through its manway and the assembly connected by liquid pressure lines to a control device and to a source of pressurized cleaning fluid. A high pressure spray nozzle is mounted for universal movement relative to two perpendicular axes. Separate hydraulic actuators are connected to and activated from a remote control device, which is air operated and with means for adjusting the speed and degree of sweep of the spray nozzle, thereby enabling a spray of any configuration to be generated. Thus, in addition to providing more versatile manipulation and control of spray nozzles, the Jaeger apparatus is portable and is inserted into a tank car through its manway.

Similarly, in U.S. Pat. No. 3,001,534, Grant teaches a portable apparatus for cleaning a tank car by being inserted thereinto. A baseplate temporarily replaces a tank car's dome cover and supports an assembly extending into the interior of the car and carrying rotating spray heads. These spray heads are driven by an electric motor and rotate about two orthogonal axes, thereby permitting water spray throughout a tank car's interior. Thus, in addition to improving the prior art with a portable top-insertable apparatus, the Grant apparatus is easily positioned within the tank car and directs a controllable, compound water spray pattern throughout the interior thereof using swivel means. The number of revolutions of the swivel means is determined by the relative ratios of two sets of pinions and gears.

Further improvements in the prior art are disclosed by Looper and Maton. In U.S. Pat. No. 4,244,523, Looper teaches a top-inserting apparatus for conveniently and inexpensively cleaning rubber-lined tank cars. This apparatus consists of a fixed frame for supporting a tiltable frame from which extends a pivotally mounted wash nozzle assembly containing a cleaning liquid tube at the end of which is connected spray nozzles. The spray jets operate simultaneously on longitudinal and transverse axes of the tank car promoting thorough cleaning thereof. Similarly, in U.S. Pat. No. 4,341,232, Maton discloses a tank cleaning apparatus which limits the rotation of top-insertable spray arms to 180° instead of the conventional 360°. By only rotating spray arms through 180° during the washing cycle, matter dislodged from the interior of a tank car is prevented from being forced upon already cleaned surfaces because a spray pattern is formed which directs such dislodged material to one end of the car or to its bottom.

Notwithstanding these improvements in the tank cleaning and stripping art, there is still not available an automatic and reliable apparatus and method cleaning tank cars and the like and for stripping the linings therein contained. It would be advantageous for an apparatus to be sufficiently portable to be completely inserted through an existing manway and then be conveniently and quickly assembled therein. It would also be advantageous for such an apparatus to be readily configured so as to accommodate tank cars of various lengths and diameters, and having various size thermal wells.

Those skilled in the art would also appreciate the utility of an apparatus capable of generating and accurately controlling a high pressure and high volume liquid spray such that the entire interior surfaces of a tank car and the like would be effectively treated, even containing a lining thereon. Such effective liquid spray would preclude the present conventional use of abrasive cleaning of linings, thereby significantly prolonging the longevity thereof. It would be further advantageous if such apparatus were driven within the tank car by a nonelectrical motor to avoid a potential safety hazard due to sparks causing combustion or explosion.

Accordingly, these limitations and disadvantages of the prior art are overcome with the present invention, and improved means and techniques are provided which are useful for cleaning and stripping residue, contaminants, debris, etc. from all of the interior surfaces in a railway tank car and the like, such that the means may be conveniently lowered into a tank car through its manway and, after quick assembly thereof, pneumatically configured to accommodate the particular physical dimensions of the tank car, and then be preset for automatic cleaning and/or stripping operation.

SUMMARY OF THE INVENTION

The present invention provides an improved apparatus and method cleaning and stripping residue, contaminants, debris, etc. from all of the interior surfaces in a railway tank car and the like, with minimal prerequisites heretofore unknown in the prior art. The present invention discloses means which may be conveniently lowered into a tank car through its manway and, after quick assembly thereof, pneumatically configured to accommodate the particular physical dimensions of the tank car, and then be preset for automatic cleaning and/or stripping operation.

In accordance with the present invention, means and methods are provided which enable half of a tank car and the like to be effectively cleaned without worker intervention. As will be described in detail, the present invention teaches a synergistic means which inherently coordinates and synchronizes the cleaning and stripping of virtually every internal surface contained in a tank car and the like.

The preferred embodiment of the present invention comprises an X-frame assembly having a pair of corresponding X-members which are attached by an axle disposed therebetween. Pivotally attached to this X-frame assembly is a swivel support assembly which houses a swivel, drive means and a hydraulic pump, and also receives a K-fame assembly. The K-flame assembly comprises a plurality of arm means, linkage means and spray means for spraying all of the interior surfaces of a tank car and the like. In accordance with the teachings of the present invention, the end walls or bulkheads of a tank car are cleaned and stripped while the preferred embodiment is situated in a "hold" or "stationary" mode; the sidewalls, ceiling and floor of a tank car are cleaned and stripped while the preferred embodiment is situated in a "tracking" mode. The transition from such hold mode to tracking mode is accomplished automatically by the present invention, whereby substantially longitudinal half of a tank car may be cleaned or stripped without human intervention. In addition, such tank car treatment is typically accomplished with speed and reliability heretofore unknown in the prior art.

It is feature and advantage of the present invention that its linear tracking along the floor of a tank car and the like is synchronized with the rotational movement of its spraying means. Nevertheless, as will be described in detail, the tracking speed of the present invention via its pneumatically controlled tire assemblies may be changed independently of the rotational speed of its spray means. In accordance with the preferred embodiment, a high pressure spiral spray pattern is delivered to the internal surfaces of a tank car and the like, through a novel linkage of a plurality of arm means comprising a K-frame assembly. Rotational motion of a swivel is effected by a hydraulically driven motor. Thus, under the present invention, sources of power are limited to air and water, thereby avoiding electrical hazards and other dangers common in wet, chemical environments.

Accordingly, in accordance with the present invention, methods and means are provided to enable a tank car and the like to be effectively and quickly cleaned with minimal worker intervention. It is also within the teachings of the present invention that lined tank cars and the like may be effectively and quickly cleaned and stripped with minimal worker intervention.

It is an object of the present invention to provide means and method for effectively and safely cleaning and stripping tank cars and the like.

It is also an object of the present invention to provide a means and method for cleaning and stripping tank cars and the like which requires only minimal worker intervention.

It is a further object of the present invention to provide an apparatus for cleaning and stripping tank cars and the like which may be remotely adapted to accommodate all interior surfaces thereof.

It is a feature and advantage of the present invention that an entire half of a tank car and the like may be automatically cleaned and stripped before any worker intervention is required for similarly cleaning and stripping the other half thereof. Thus, worker intervention associated with the present invention limited to only a few minutes of initial set up time and then its positioning for treating the remainder of a tank car and the like has heretofore unknown in the prior art. It is accordingly an object of the present invention to provide an improved means which may conveniently be lowered thereto through a manway, quickly assembled and positioned, and then automatically clean and strip at least an entire half of a tank car and the like.

It is a further object of the present invention to provide a means for cleaning tank cars and the like which operates in the absence of electric power therein.

It is also an object and feature of the present invention that an apparatus and method are provided which enables those skilled in the art to strip liners contained in tank cars and the like by exercising accurate control of the distance between spray nozzles and the lining's surfaces. Hence, it is an advantage of the present invention that the longevity of tank car liners is sustained by the nozzle location precision heretofore unknown in the art.

It is another object of the present invention to provide a means which inherently synchronizes its linear tracking longitudinally along the floor of a tank car and the like, with the rotational movement of a swivel assembly.

It is an object and feature of the present invention to provide a means which automatically adapts to the dimensions of a tank car and the like.

It is a specific object of the present invention to provide, in a tank car having a plurality of interior surfaces including a floor, side walls, end walls and a ceiling having a manway for access of a worker thereinto, a cleaning and stripping apparatus comprising: a X-frame assembly comprising: a first X-member fixedly attached to a second X-member by an axle disposed therebetween, and having a swivel support assembly rotatably attached thereto; a first sleeve member fixedly attached to said first X-member and to said second X-member; a second sleeve member fixedly attached to said second X-member and to said first X-member; a first sprocketed sleeve member fixedly attached to said first X-member and to said second X-member, and disposed oppositely of said first sleeve member; a second sprocketed sleeve member fixedly attached to said second X-member and to said second X-member, and disposed oppositely of said second sleeve member; first sprocket means disposed concentrically of said first sprocketed sleeve member for receiving roller chain means; and second sprocket means disposed concentrically of said second sprocketed sleeve member for receiving said roller chain means; said first X-member and said second X-member pivotally attached at their longitudinal midpoints by said axle disposed perpendicularly of each of said first and second X-member; said X-frame assembly configured to be insertable into said manway when arranged in a compressed position and further configured to receive a plurality of pneumatic tire assemblies mad to support a K-frame assembly when said X-frame assembly is arranged in an extended position; said K-frame assembly releasably and rotatably attached to said swivel support assembly and having swivel means: fluid supply conduit means connected to said swivel support assembly for operating hydraulic motor means for rotating said swivel means; spray means fixedly attached to said swivel means for forming a fluid spray pattern upon said plurality of interior surfaces of said tank car; and air supply conduit means connected to a plurality of air cylinder means hingedly connected to said X-frame assembly for pneumatically controlling said compressed or extended configuration of said X-frame assembly, connected to drive means for pneumatically controlling linear movement of said X-frame assembly independently of movement of said rotation of said swivel means and for synchronizing said rotational movement of said swivel means with said linear movement of said X-frame assembly.

It is another specific object of the present invention to provide a method for cleaning and stripping a plurality of interior surfaces of a tank car, including a floor, a pair of side walls, a pair of end walls and a ceiling, said tank car having a manaway for access of a worker thereinto, said method comprising the steps of: inserting a compressed X-frame assembly having a swivel support assembly rotatably attached thereto into said manway; affixing the axles of four corresponding pneumatic tire drive assemblies to said X-frame assembly; positioning said pneumatic tire drive assemblies on said floor of said tank car: further affixing the axles of four corresponding pneumatic tire stabilizing assemblies to said X-flame assembly; connecting air conduits to a pair of air cylinders hingedly attached to said X-frame assembly; pneumatically configuring said X-frame assembly so that said pneumatic tire drive assemblies contact said floor of said tank car and said pneumatic tire stabilizer assemblies simultaneously contact said ceiling thereof: pivoting said swivel support assembly from a position substantially perpendicular of said floor of said tank car to a position substantially parallel to said floor and pointed toward one of said pair of end walls; further inserting an extended K-frame assembly having swivel means into said manway: attaching said K-frame assembly to said swivel support assembly: further connecting fluid conduits to said swivel support assembly, for communicating fluid to spray means contained in said swivel means and for operating a hydraulic pump contained in said swivel support assembly: further positioning said spray means proximal to said one of said pair of end walls; initiating fluid flow through said fluid conduits, for activating said hydraulic pump and said spray means; engaging clutch means contained in said swivel support assembly, for cleaning and stripping said one of said pair of end walls; holding said X-frame assembly in position with said spray means proximal to said one of said pair of end walls: disengaging said clutch means and releasing said X-frame assembly, for cleaning and stripping said pair of side walls, said ceiling and said floor of substantially a longitudinal half of said tank car; driving said pair of pneumatic tire drive assemblies linearly and longitudinally along said floor of said tank car and synchronizing simultaneous rotating of said swivel means for producing a spiral spray pattern from said spray means; detaching said K-frame assembly from said swivel support assembly: further pivoting said swivel support assembly through substantially 180° maintaining its position substantially parallel to said floor and pointed toward the opposite one of said pair of end walls; and repeating said attaching, engaging and disengaging steps for cleaning and stripping said plurality of interior surfaces of substantially the remaining longitudinal half of said tank car.

These and other objects and features of the present invention will become apparent from the following detailed description, wherein reference is made to the figures in the accompanying drawings.

IN THE DRAWINGS

FIG. 3A depicts an enlarged view of the apparatus depicted in FIG. 1.

FIG. 3B depicts a front view of the apparatus depicted in FIG. 3A.

FIG. 4A depicts an enlarged front view of a portion of the apparatus depicted in FIG. 2.

FIG. 4B depicts an enlarged front view of a portion of the apparatus depicted in FIG. 2.

FIG. 5 depicts a enlarged front view of the apparatus depicted in FIG. 2.

FIG. 6 depicts an enlarged front view of a portion of the apparatus depicted in FIG. 5, with said apparatus rotated counterclockwise through 90° and depicted in a partially spread position.

FIG. 7 depicts the apparatus depicted in FIG. 6 in a compressed position.

FIG. 8 depicts the apparatus depicted in FIG. 6 in a full spread position.

FIG. 9 depicts an enlarged partial cut-away front view of a portion of the apparatus depicted in FIG. 5.

FIG. 10 depicts a left side view of the apparatus depicted in FIG. 9, along line 10—10.

DETAILED DESCRIPTION

Figure 1:
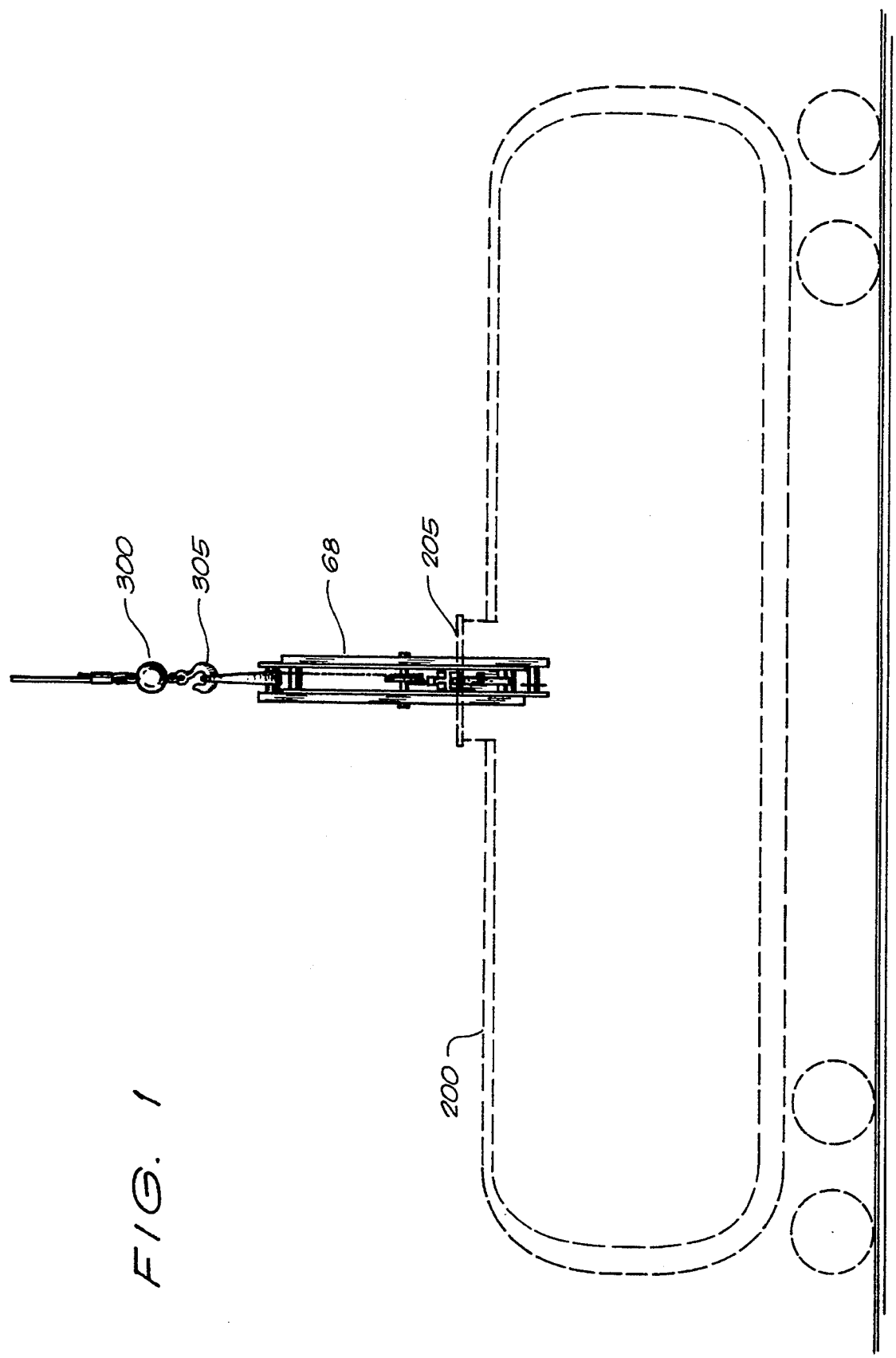
FIG. 1 depicts a right side view of a portion of an apparatus embodying the present invention, with this apparatus being lowered into a railroad tank car.

Referring to FIG. 1, there is depicted a simplified frontal view of railroad tank car 200 with X-frame assembly 68 (as will be described in detail, each of a pair of corresponding members are configured essentially in the shape of a letter "X" and, accordingly, attachment 68 is referred to herein as "X-frame assembly" and each of its pair of such members as "X-members") of the present invention being lowered by hoist 300 through manway 205 into tank car 200. More particularly, there is shown a right side view of X-frame assembly 68 configured in a folded position to enable easy entry thereof into tank car 200 through manway 205. Also shown is debris film or layer 215 disposed upon the interior surfaces of tank car 200.

Figure 2:
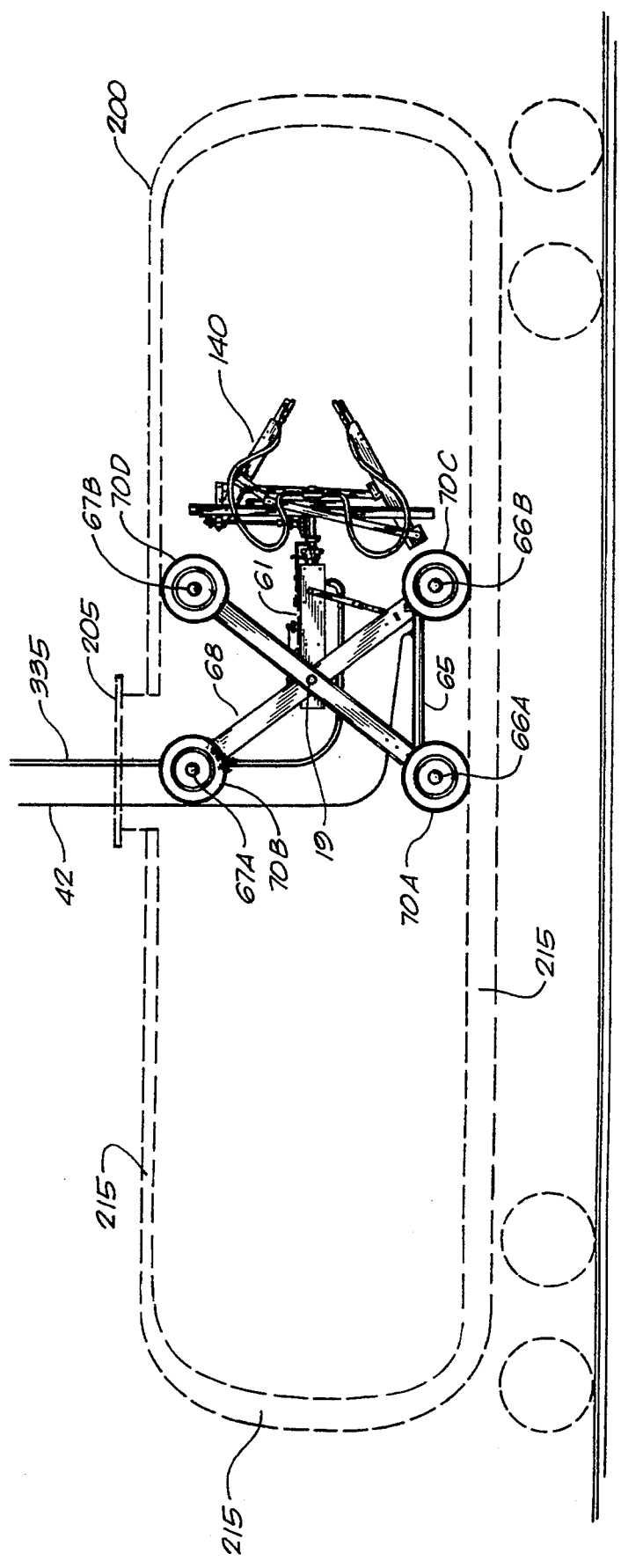
FIG. 2 depicts a front view of an apparatus embodying the present invention, with this apparatus being disposed in a railroad tank car.

Now referring to FIG. 2, there is depicted a similar simplified frontal view of railroad tank car 200 as depicted in FIG. 1, but with X-frame assembly 68 configured in an extended position. In particular, X-frame assembly 68 is shown with a first X-member comprising channel frame 59A and flat frame 60A substantially perpendicular of each other. Also depicted is swivel support bracket 61 which is rotatably attached to shaft 19 of X-frame assembly 68. As shown, channel frame 59A and flat frame 60A are preferably secured to shaft 19, at the intersection thereof, by a suitably sized bolt.

Referring now to FIGS. 2 and 3A–B, there is seen K-frame assembly 140 releasably interconnected with swivel support bracket 61 by quick-connect member 11. Pneumatic tires 70A and 70C are affixed to lower drive sleeves 290A and B, respectively. As will be hereinafter explained in detail, pneumatic tires 170B and 70D (not shown) are affixed to upper, dead sleeves 240A and B, respectively. Pneumatic tires 70A, B, C and D are preferably identical.

Referring now to FIGS. 3A and 3B, there is depicted corresponding right side and frontal enlarged views, respectively, of X-frame assembly 68 depicted in its extended position as in FIG. 2. It is seen that X-frame assembly 68 comprises two sets of X-members: first X-member comprising channel frame 59A and flat frame 60A, and corresponding second X-member comprising channel frame 59B and flat frame 60B. Channel frames 59A and B are preferably constructed from conventional angle-iron containing channels 250A and B, respectively, to impart strength to X-frame assembly 68. In particular, channel frame 59A is shown having longitudinal channel 250A throughout its length; similarly, channel frame 59B is shown having longitudinal channel 250B throughout its length. On the other hand, frames 60A and B are constructed from conventional flat iron to enable their being folded together with paired frames 59A and B to form a substantially linear arrangement thereof. As shown in FIG. 1, this linear arrangement enables the convenient entry of X-frame assembly 68 through a railway tank car hatch or manway.

The first set of frames depicted in FIGS. 3A–B comprise channel frame 59A and flat frame 60A. Channel frame 59A has socket 63B at one end and socket 63D at the other opposite end thereof. Flat frame 60A has socket 63A at one end and socket 63C at the other opposite end thereof. The second set of frames depicted in FIG. 3A comprise channel frame 59B has socket 63D at one end and socket 63B sprocket 57D at the other opposite end thereof; flat frame 60B has socket 63C at one end and socket 63B sprocket 57C at the other opposite end thereof. Channel frame 59A and flat frame 60B are fixedly interconnected at the top portion thereof by sleeve 240A and at the bottom portion thereof by sprocketed sleeve 290A. Sprocketed sleeve 290A contains sprocket 57A disposed transversely thereon and sprocketed sleeve 290B contains sprocket 57B disposed transversely thereon.

As shown in FIG. 3A, "folding" of channel frames 59A and B together with flat flames 60A and B is accomplished by pivoting the respective socketed ends 63A, B, C, D of each pair of channel and flat frames together, thereby juxtaposing flat frame 60A upon channel frame 59A and simultaneously juxtaposing flat frame 60B upon channel frame 59B. In such a compressed or folded configuration, the present invention may be inserted through manways as small as 17½ inches in diameter.

Now referring to FIGS. 3A–B and 4A–B and C, channel frame 59A is seen to have a pair of sleeves 240A and 290A disposed at each opposite end thereof. More particularly, sleeve 240A is disposed at the end portion of channel frame 59A perpendicularly of socket 63B and is configured to receive pneumatic tire assembly 225A as will hereinafter be described in detail. Similarly, sprocketed sleeve 290A is disposed at the other opposite end portion of channel frame 59A perpendicularly of socket 63D and is configured to receive pneumatic tire assembly 275A as will hereinafter be described in detail. Likewise, flat frame 60A is seen to have a pair of sleeves 240B and 290B disposed at each opposite end thereof. Sleeve 240B is disposed at the end portion of channel frame 59B perpendicularly of socket 63D and is configured to receive pneumatic tire assembly 225A. Similarly, sprocketed sleeve 290B is disposed perpendicularly of socket 63D and is configured to receive pneumatic tire assembly 275A.

Referring specifically to FIGS. 3A–B, there is also depicted air cylinder 65 hingedly attached to channel frame 59A at hinge 260 and to flat frame 60A at hinge bracket 265. Air line 42 provides air to air cylinder 65 from air supply 170 (not shown). Water line 335 carries water from water supply 330 (not shown) through elbow 340 to water swivel support 61.

In accordance with the present invention, as depicted in FIGS. 3A–B and 4A–B, once X-frame assembly 68 is placed upon the floor of a railroad tank car, four pneumatic tire stabilizer assemblies, each configured as shown by pneumatic tire assembly 225A, are inserted into corresponding sockets 63A and B, and 63A' and B' (not shown), respectively. Similarly, four pneumatic the drive assemblies, each configured as shown by pneumatic tire assembly 275A, are inserted into corresponding sockets 63C and D, and 63A' and B' (not shown), respectively. In particular, axle 67A of a first pneumatic tire stabilizer assembly 225A is inserted into socket 63A and, in turn, received by the portion of sleeve 240A adjacent socket 63A. Similarly, axle 67A of a second pneumatic tire stabilizer assembly 225A (not shown) is inserted into socket 63B and, in turn, received by the portion of sleeve 240B adjacent socket 63B. Also, axle 67A of a third pneumatic tire stabilizer assembly 225A is inserted into socket 63A' (not shown) and, in turn, received by the end portion of sleeve 240A disposed remotely and oppositely of socket 63A. Similarly, axle 67A of a fourth pneumatic tire stabilizer assembly 225A is inserted into socket 63B' (not shown) and, in turn, received by the end portion of sleeve 240A disposed remotely and oppositely of socket 63B.

Similarly, axle 66A of a first pneumatic tire drive assembly 275A is inserted into socket 63C and, in turn, received by the portion of sleeve 290A adjacent socket 63C. Similarly, axle 66A of a second pneumatic tire drive assembly 275A (not shown) is inserted into socket 63D and, in turn, received by the portion of sleeve 290B adjacent socket 63D. Also, axle 66A of a third pneumatic tire drive assembly 275A is inserted into socket 63C' (not shown) and, in turn, received by the end portion of sleeve 290A disposed remotely and oppositely of socket 63C'. Similarly, axle 66A of a fourth pneumatic tire drive assembly 275A is inserted into socket 63D' (not shown) and, in turn, received by the end portion of sleeve 290A disposed remotely and oppositely of socket 63D.

Air pressure is then applied to air cylinder 65 through air line 42, thereby retracting piston rod 82 and reducing equal vertical angles $\alpha$ and $\beta$, which are formed by the intersection of channel frame 59A and flat frame 60A, as these flames are caused to cooperatively pivot about shaft 19. Simultaneously, as the top portions of each channel and flat frame are pneumatically arched toward the ceiling of a railroad tank car, preferably four identical pneumatic tires 70E, F, G and H (not shown), rotatably attached to respective ends of sleeves 240A and B are caused to establish contact with the ceiling thereof. Similarly, as the bottom portions of each channel and flat fame are pneumatically arched toward the floor of a railroad tank car, preferably four identical pneumatic tires 70A, B, C (not shown) and D (not shown), rotatably attached to respective ends of sleeves 290A and B, are caused to establish contact with the floor thereof. Thus, once X-frame assembly 68 is properly installed within a tank car and the like, each of its eight tires preferably contact an upper or lower surface thereof. In accordance with the present invention, sustained air pressure in cylinders 65A and B maintain pneumatic tire contact on each of eight points on these surfaces.

In accordance with the present invention, since each of the axles about which each pair of pneumatic tires rotate are substantially of equal length, pivot pin 19 will remain substantially at the centroid of a tank car's interior. It should be clear to those skilled in the art that the instant X-frame assembly design is a novel and important aspect of the present invention, wherein ease of access and simplicity of set-up are provided. As shown in FIGS. 4A–B, depicting pneumatic tire stabilizer and drive assemblies 225A and 275A, respectively, axles 67A and 66A are provided with threaded shafts 230A and 280A, respectively, to allow adjustment in axle length to accommodate wider or shorter diameter tank cars. Thus, in pneumatic tire stabilizer assembly 225A, axle 67A may be screwed toward threaded shaft 230A, i.e., screwed clockwise, to reduce the length thereof. Contrariwise, axle 67A may be screwed away from threaded shaft 230A, i.e., screwed counter-clockwise, to increase the length thereof. Jam nut 235A enables such adjustments to be made quickly and conveniently. Alternatively, a sliding adjustment or telescopic spring-loaded mechanism may be used to adjust axle length.

As will be hereinafter described in detail, referring to FIGS. 2, 3A–B, and 4A–B, sprockets 57A and B cooperate with respective drive axles 66A of said first and second pneumatic tire drive assemblies 275, and sprockets 57A' and B' (not shown) cooperate with respective drive axles 66A of said third and fourth pneumatic tire drive assemblies 275A to linearly move the present invention along the floor of tank car 200. Specifically referring to FIGS. 4B, axle 66A is configured with notch 295A to enable corresponding pair of pneumatic tire drive assemblies 275A to be joined together and secured with bolt 297A. In accordance with the present invention, when corresponding sprockets 57A–A' are caused to rotate, the joined axle-pair 66A, formed as hereinbefore described via matching notches 295A, is, in turn, caused to rotate simultaneously with its respective tires 70C and D (not shown). Lug 298 is mounted on tire assembly 275A to assure that axle 66A and tires 70C and D (not shown) rotate together. Thus, lower tire drive assemblies enable the instant apparatus to traverse the floor of a tank car functioning like a positive 4-wheel drive vehicle.

The set of four tires contacting the tank car ceiling, 70E, F, G and H, rotate freely upon conventional bearings about their respective axles 67A. Sleeves 240A and B, in turn, cooperate with dead axles 67A of each pneumatic tire stabilizer assembly 225A to stabilize the position of the present invention along the ceiling of tank car 200.

As depicted in FIGS. 4–B, while drive axle 66A of pneumatic tire assembly 275A should preferably be constructed with a larger diameter than dead axle 67A of pneumatic tire stabilizer assembly 225A, in applications involving smaller vehicles like truck trailers and transport tankers, axles 66A and 67A may be substantially the same diameter. This, of course, is due to the particular embodiment of the present invention being adapted to a smaller-sized vehicle.

Referring now to FIG. 5, in accordance with the present invention, K-frame assembly 140 is releasably connected to swivel support 61 of X-frame assembly 68 by hammer-on quick connect 11. More particularly, hammer-on connector 11 is preferably a pipe fixture that serves as a support and a conduit for high pressure water. As depicted in FIG. 6, K-frame assembly 140 is configured essentially in the shape of a letter "K" formed by frame 9, flying arms 7 and 8, and link arms 5 and 6. Accordingly, attachment 140 is referred to herein as "K-frame assembly." As will be hereinafter described in detail, in accordance with the present invention, to perform cleaning and stripping heretofore unknown in the prior art, this K-frame assembly is caused to vary its configuration of this plurality of arm means from the K-formation shown in FIG. 6 to the extended configuration shown in FIG. 8 to the compressed configuration shown in FIG. 7.

Referring to FIGS. 5–8, during all cleaning and stripping operations, K-frame assembly 140 rotates about an axis defined by water conduit 10. As will become evident to those skilled in the art, when engaged to process the bulkheads or end walls of a tank car, K-flame assembly 140 starts in its compressed configuration shown in FIGS. 5 and 7, and rotates horizontally about this axis. Included in this rotation action is water conduit 10 and attached connector 11, but excluded therefrom is actuator drive gear assembly 1. Under the present invention, drive gear assembly 1 remains engaged to swivel support 61 as K-frame assembly 140 rotates about its transverse axis. Thus, every member comprising K-frame assembly 140 depicted in FIGS. 6–8 rotates about water conduit 10 except drive gear assembly 1.

Figure 14:
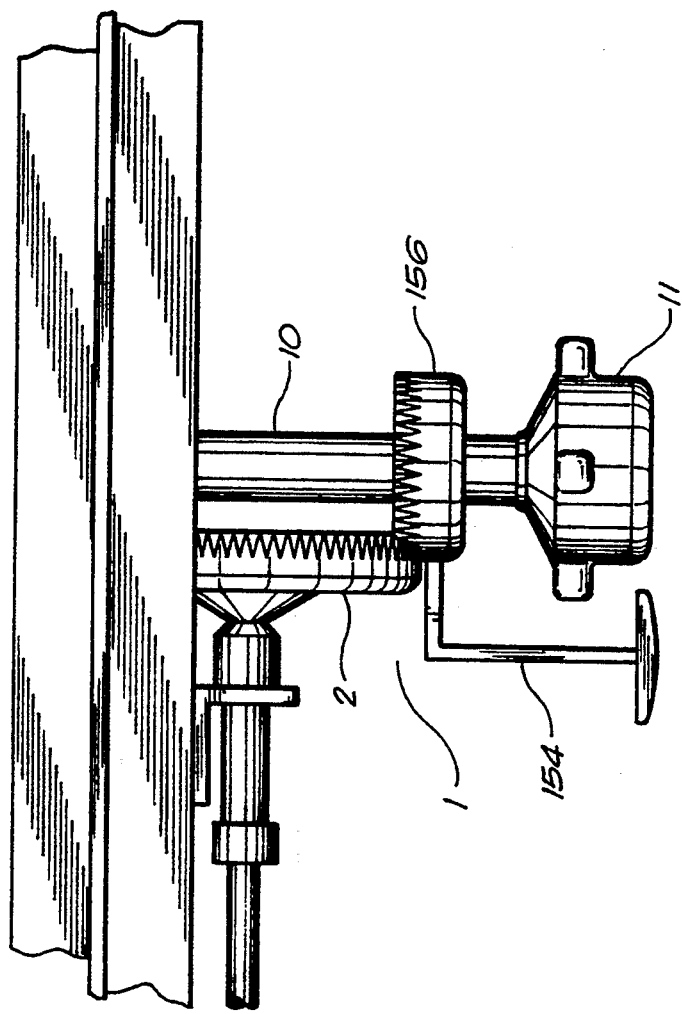
FIG. 14 depicts an enlarged view of a portion of the apparatus depicted in FIGS. 6–8.

As specifically shown in FIG. 14, an enlarged frontal view of actuator drive gear assembly 1 which is depicted in FIGS. 5–8, this drive gear assembly comprises drive gear 156 and drive arm 154. In accordance with the present invention, and now referring to FIGS. 6–8 and 14, when actuator driven gear 2 is meshed with stationary drive gear 156 of drive gear assembly 1, actuator screw 3 is caused to turn, thereby advancing actuator yoke 4. As will become clear to those skilled in the art, through a linkage provided by actuator drive gear assembly 1 and clutch 46 (see FIG. 11 ), every revolution of K-frame assembly 140 incrementally propels yoke 4, thereby gradually increasing or decreasing the radius of water spray emanating from nozzles 160A and B. For example, if yoke 4 is propelled toward the end portion of actuator screw 3 adjacent hinge 15A, as depicted in FIG. 7, then the radius of water spray is a gradually decreasing spiral pattern. On the other hand, if yoke 4 is propelled toward the end portion of actuator screw 3 adjacent hinge 15B, as depicted in FIG. 6, then the radius of water spray is a gradually increasing spiral pattern. The engagement of stationary drive gear 156 to X-frame assembly 68 via clutch 46 causes driven gear 2 to turn from its posterior side. That is, driven gear 2 is engaged with and tracks over drive gear 156 based upon the hereinbefore referenced linkage.

As will be described in detail, advancing yoke 4 along actuator screw 3 causes a plurality of interconnected arm means to be either pushed or pulled, in coordinated fashion, whereby the spiral spray emanating from nozzles 160 A–B is regulated. In particular, advancing yoke 4 along actuator screw 3 pushes or pulls lead link arm 6, which, in turn, corresponding pulls or pushes lead flying arm 7, which, in turn, causes corresponding movements in drag link ann 5 and drag flying arm 8. In accordance with preferred embodiment of the present invention, flying arm 7 leads the movement of K-frame assembly 140 wherein the spray coverage emanating from pair of nozzles 160A–B is regulated. Flying arm 8, which is preferably configured to be smaller than flying arm 7, follows the lead thereof. Flying arm 8 is preferably welded to drag link arm 5 by transversal 13. Flying arm 7 is pivotally attached to drag link arm 5 by hinge 17 and also pivotally attached to lead link arm 6 by pivot pin 6b. Drag link arm 5 remains a set length serving as a retractor of lead flying arm 7. On the other hand, the length of lead link arm 6 and the point of its connection 6b lead flying arm 7 can be either shortened to speed up the cycle or lengthened to slow down the cycle. More particularly, lead link ann 6 is pivotally attached to lead flying arm 7 at 6b and is pivotally attached to actuator yoke 4 at 6a. Thus, by controlling the length of lead link arm 6, the width of a pattern of spiral lines described by spray emanating from nozzles 160A–B may be regulated.

It is also within the teachings of the present invention that the inherent speed of movement of flying arm 8 in response to the movement of flying arm 7 may be controlled by the placement of pivot pin 6b along flying arm 7. Thus, in an alternate embodiment of the present invention, flying arm 7 may be constructed with a plurality of holes or the like to pivotally receive link arm 6. For example, if link ann 6 is rotatably attached to flying arm 7 by moving 6b closer to the nozzle-end thereof, the movements of K-frame assembly 140 are reduced. As another example, if link arm 6 is rotatably linked to flying arm 7 by moving 6b closer to pivot pin 16B, the movements of the K-frame assembly are accelerated.

K-frame assembly 140, when positioned near the bulkhead of a tank car, preferably produces a water spray with a spiral coverage of approximately 200°, corresponding to overlapping 90° coverage of each nozzle. Actuator yoke 4 preferably includes split nut 158 that can be loosened for quick adjustment of the position of flying arm 7 and 8.

As shown in FIG. 8, retracting flying arms 7 and 8 into the full spread position makes it possible to clean and strip the side walls of a tank car and the like. The versatility of the design inherent in the present invention provides several advantages heretofore unknown in the art. Since the preferred axis of rotation of the present invention is the theoretical center of a cylinder or tank car, it should be set up at a predetermined distance from the bulkhead or end wall thereof. After X-frame assembly 68 is properly installed therein with eight pneumatic tire assemblies and K-frame assembly attached thereto, split nut 158 of actuator yoke 4 is loosened and yoke 4 is repositioned at a point on actuator screw 3 that holds flying arms 7 and 8 in the position aiming their nozzles 160A and B, respectively, at the center of the bulkhead or end wall. In accordance with the present invention, the stream of water emanating from nozzles 160A and B converge at this point. Then, once cleaning and counter-clockwise rotation of K-frame assembly 140 begin, this water spray describes a path of ever-increasing spiral from the center configuration (see FIG. 7) to the full spread configuration (see FIG. 8), covering every square inch of the end wall.

Nozzle supports 14A and B are manually adjustable to accommodate different diameter tank cars and the like.

When the full spread position depicted in FIG. 8 is reached, the meshing of drive gear 156 and driven gear 2 is disengaged and control mechanism 36 (FIG. 11) is engaged as will be hereinafter described in detail, thereby changing the mode of operation of the present invention from the stationary brake mode to the tracking mode. Under the present invention, once the treatment of the bulkhead is completed, with a concentrated water spray, the K-frame is configured in its extended configuration, as depicted in FIG. 8, whereby it commences to linearly track toward the middle of the tank car, treating the interior side wall and concomitant top and bottom surfaces thereof. Thus, it is an advantage and feature of the present invention that a longitudinal half of a tank car can be processed automatically, once properly positioned therein, as has hereinbefore been described in detail.

Figure 11:
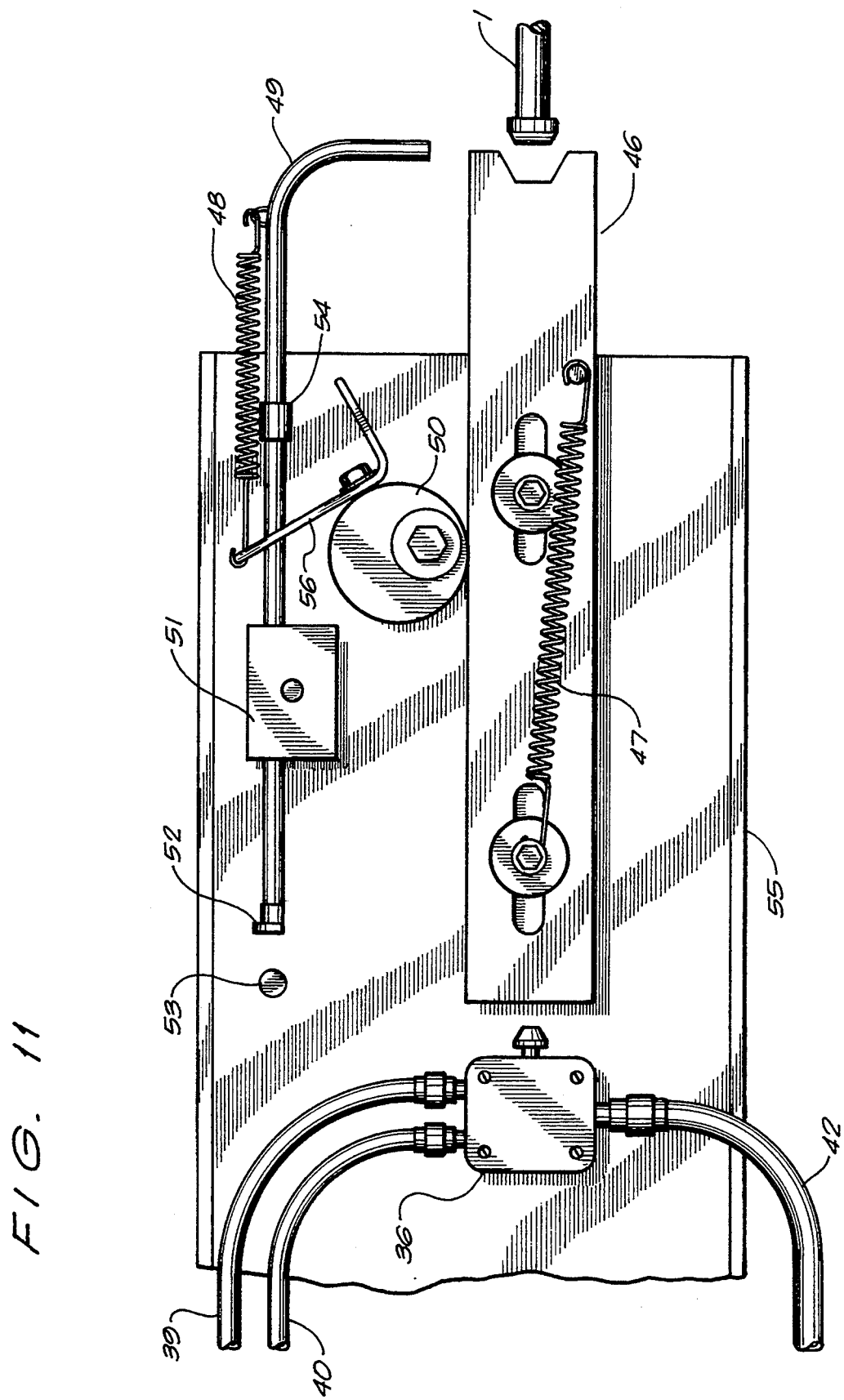
FIG. 11 depicts an enlarged front view of a portion of the apparatus depicted in FIGS. 6–8.

In accordance with the teachings of the present invention and referring to FIGS. 2, 5 and 11, during cleaning and stripping of a tank car's end walls or bulkheads, the functions performed by actuating K-frame assembly 140 are preferably accomplished by engaging clutch 46 with actuator drive gear assembly 1. This engagement is typically set manually at the beginning of the cleaning and stripping process. Clutch base 55 is mounted over swivel 62 on swivel support bracket 61. Flying arms 7 and 8 of K-frame assembly 140 are also manually adjusted to point to the center of the bulkhead, actuator yoke 4 is locked in place and clutch 46 is engaged with actuator drive gear assembly 1. Actuating K-frame assembly 140 by rotating counter-clock,vise changes its configuration from a compressed center position depicted in FIG. 7 through an intermediate position depicted in FIG. 6 into a full spread position depicted in FIG. 8. In accordance with the teachings of the present invention, as has been explained hereinbefore, this configuration change can be accomplished by varying the speed of rotation of the K-frame or by varying the rate of actuation. For stripping rubber off the interior lining of a railroad tank car for example, 300 to 400 revolutions are typically required. As another example, to clean such linings typically takes from 150 to 300 revolutions. It is an advantage of the present invention that such operations, even at the lowest speed of rotation, nominally consume only about one hours' time. For comparable stripping and/or cleaning in the prior art, typically one man-day is required to complete this demanding task. Furthermore, using the methodology and apparatus known to those skilled in the art produces less reliable cleaning and stripping results. This, of course, is due to the absence of inherent regularity provided by an automatic procedure like the present invention.

Referring again to FIG. 11, once actuator yoke 4 contacts release arm 49, it causes ann 49 to turn, which thereby causes associated release pawl 52 to be dislodged from pawl post 53. Release arm spring 48 then pulls release arm 49 through release arm slide mount 51. As should be understood by those skilled in the art, the impact of release actuator 54 upon eccentric striker 56, in turn, releases eccentric grab member 50 imposed on clutch 46. Clutch return spring 47 disengages clutch 46 from actuator drive gear assembly 1 and engages air supply mode valve 36, thereby transferring air supply from brake caliper 23 to air valve alternator 43. This, of course, releases the static hold on the present invention and then distributes air in sequence as the tracking mode taught by the present invention begins. This fulfills the unique "head-to-half" process provided by the present invention wherein substantially a longitudinal half of a tank car or the like is cleaned and stripped automatically once it is properly installed therein.

Referring now to FIGS. 9 and 10, the structure and function of swivel assembly 62 may be described in detail. In particular, in FIG. 9 there is shown a partial cut-away frontal view of swivel assembly 62. FIG. 10 is a cut-away left side view, along line 9—9, of swivel assembly 62 depicted in FIG. 9. Swivel assembly 62 comprises swivel shaft 72 disposed axially of swivel cylinder 76, contained within bore hole 168 and supported by end plates 73A and B, which are fixedly attached by four elongated bolts 71A, B, C and D. In accordance with the present invention, swivel assembly 62 rotates under high pressure and discharges high water volume during cleaning and stripping. For example, swivel assembly 62 typically operates as will be hereinafter described, at pressures of 10,000 psi at water volumes exceeding 100 gallons per minute. Water enters swivel cylinder 76 through induction hole 80 which is drilled normally into shaft 72 which is axially contained within bore hole 168. The water then passes along shaft 72 to end portion thereof 164. Opposite end 166 of swivel cylinder 76, contrary to end 164, contains no bore hole and thus is inherently sealed.

Figure 12:
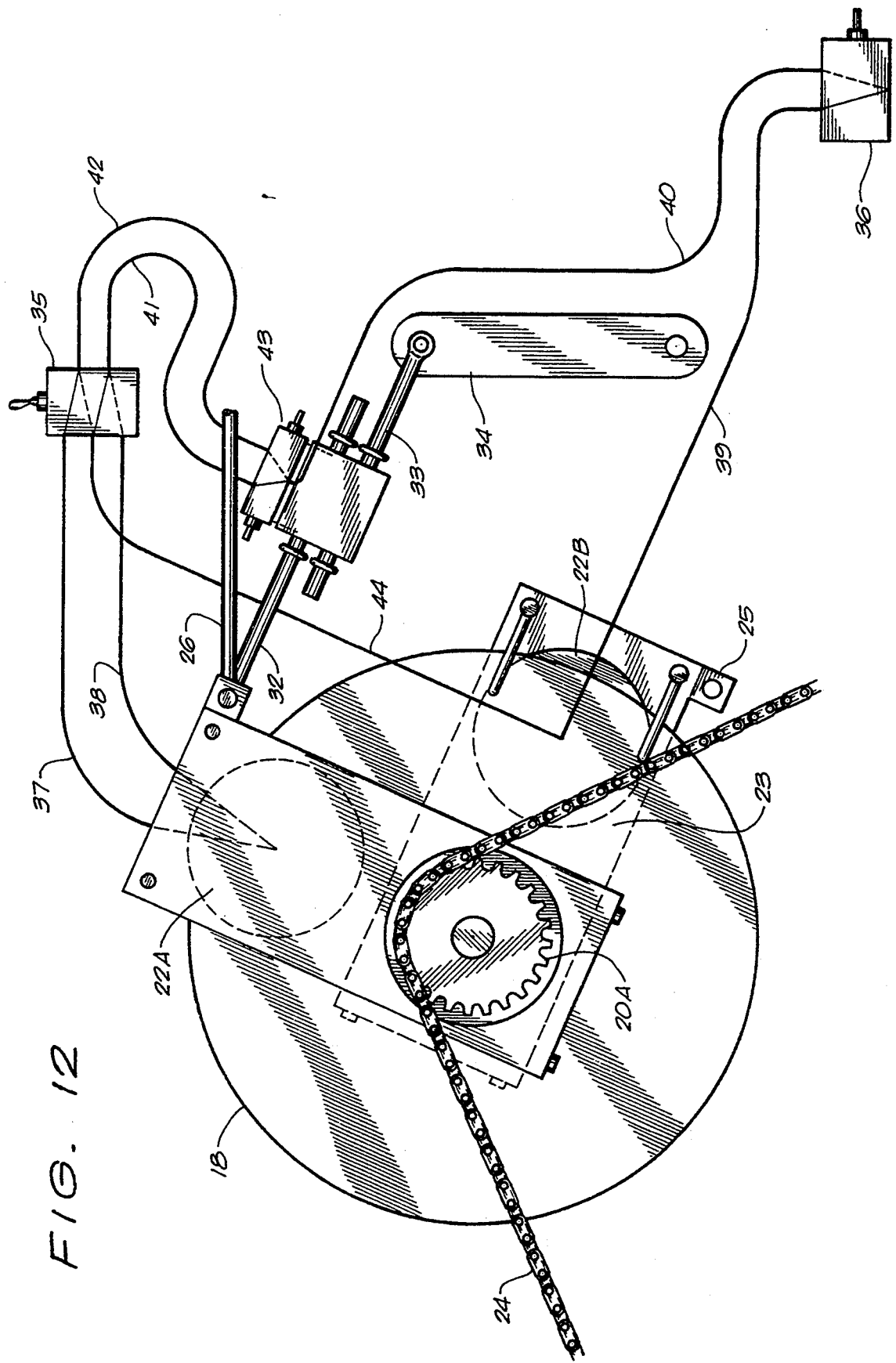
FIG. 12 depicts an enlarged front view of a portion of the apparatus depicted in FIG. 5.

Swivel shaft 72 is turned by hydraulic motor 45 (see FIG. 12). As should be apparent to those skilled in the art, subject to water pressures and volumes as hereinbefore described, swivel assembly 62 must withstand significant forces, and, indeed, must operate reliably and automatically within a tank car and the like. As should be clear to those skilled in the art, there are equal forces on each longitudinal side of induction hole 80, which tend to neutralize each other. To neutralize the intense thrust exerted particularly on swivel shaft 72, swivel assembly 62 includes packing 75 positioned on all sides of induction hole 80. Packing 75 may be Chevron-shaped sealant material which is commonly used in the hydraulics art. Another suitable material is UTEX non-adjustable plunger packing. In addition, especially in the absence of conventional thrust bearings, swivel assembly 62 is constructed with bushings 74A and B which preferably comprise solid brass rotation bearings to provide advantageous wear capabilities. Specifically referring to FIG. 9, it is seen that swivel support plates 73A and B are preferably configured squarely to provide adequate mounting surface within swivel support bracket 61.

Now referring to FIG. 12, there is seen reciprocating drive 150 which, in accordance with the present invention, enables X-frame assembly 68 with eight tire assemblies attached thereto as hereinbefore described, to track or move horizontally and longitudinally along a tank car's interior at suitable speeds without using a multitude of gears as is common in the art. In addition, reciprocating drive 150 enables tracking speed to be changed without concomitant changes of the speed of rotation of sprayer nozzles 160. Thus, by simply loosening and sliding eccentric adjust 28 (see FIGS. 5, 12 and 15) to provide a longer or shorter throw, i.e., longer or shorter advancement of the present invention along the bottom of a tank car and the like, concomitant with a given rate of rotation, tracking speed is conveniently changed.

As shown in FIGS. 5 and 12, rotation of sprayer nozzles 160 is effectuated by hydraulic motor 45 which is fixedly connected to swivel shaft 72. The tracking of the present invention, heretofore unknown in the prior art, is accomplished by inherently synchronizing its rotation and linear tracking. As particularly shown in FIGS. 13 and 15, this synchronization is provided through 1-to-1 meshing of power take-off gear 30 with accessory drive gear 29.

During the usual initial phase of cleaning and stripping of a tank car, tracking is suspended while the bulkhead is being cleaned and stripped. Hence, it is necessary to maintain the speed of rotation of sprayer nozzles 160, but without altering the established location of supporting X-frame assembly 68 on the tank car floor. It is an advantage and feature of the present invention that it affords controls providing the prerequisite capability to quickly and effectively switch from a rotation, non-tracking mode, i.e., holding mode, to a rotation, tracking mode without any pause in rotation.

Referring to FIGS. 3A–B and 12, drive disc 18 is positioned in the center of the preferred embodiment of the present invention disposed on the same rotational axis, pivot pin or axle 19, as X-frame assembly 68. It is an important feature and advantage of the present invention that drive disc 18 is independent and can spin relative to pivot pin 19, from within the confines of the frame assembly. Attached fixedly on each side of drive disc 18 and parallel thereto are drive sprockets 20A and B (not shown). Roller chains 24 run from sprockets 20A and B to corresponding sprockets 57A and B disposed normally on sleeves 290A and B, which in turn cooperate with pneumatic tire drive axles 66A and B as hereinbefore described. Thus, rotating drive disc 18 causes drive axles 66A and B to rotate.

Under the present invention, drive disk 18 is preferably rotated using air calipers as will be described in detail. Air calipers 21 and 23 have built-in air cylinders which, when supplied with air, clutch or grasp drive disc 18. More particularly, drive caliper 21 and brake caliper 23, in conjunction with built-in air cylinders 22A and B, are designed to be independent of both pivot shaft 19 and drive disc 18, but nevertheless pivot about the same axis thereof. Brake caliper 23 is anchored to X-frame assembly 68 through anchor point 25.

As will become clear to those skilled in the art, brake caliper 23 provides stability to the present invention not only during air-feed through air line 39, but also during air-feed through alternating air line 40. In particular, with a constant flow of air through air line 39, brake caliper 23 holds the present invention against the nozzle thrust encountered during cleaning and/or stripping of tank bulkheads and the like. On the other hand, with an alternating flow of air through air lines 41 and 42, brake caliper 23 holds the present invention during the tracking mode while the reciprocating action of drive caliper 21 is retracting. Conversely, brake caliper 23 releases to allow charged caliper 21 to advance drive disc 18. As should be evident to those skilled in the art, the length of this advancement is preselected at eccentric adjust 28. Ergo, while brake caliper 23 functions in a static hold-mode, drive caliper 21 functions in a dynamic rotation-mode.

Figure 13:
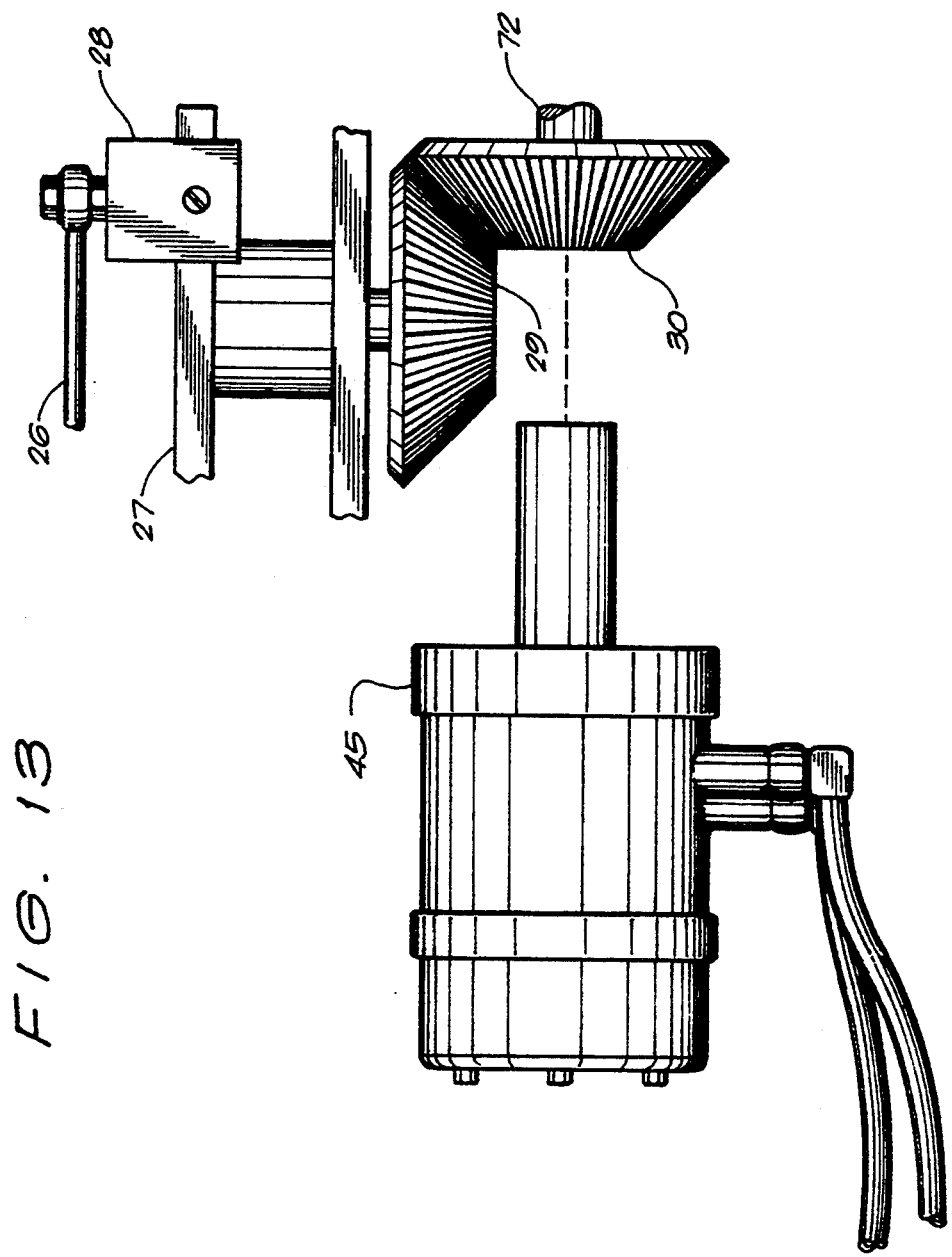
FIG. 13 depicts an enlarged view of a portion of the apparatus depicted in FIG. 15.
Figure 15:
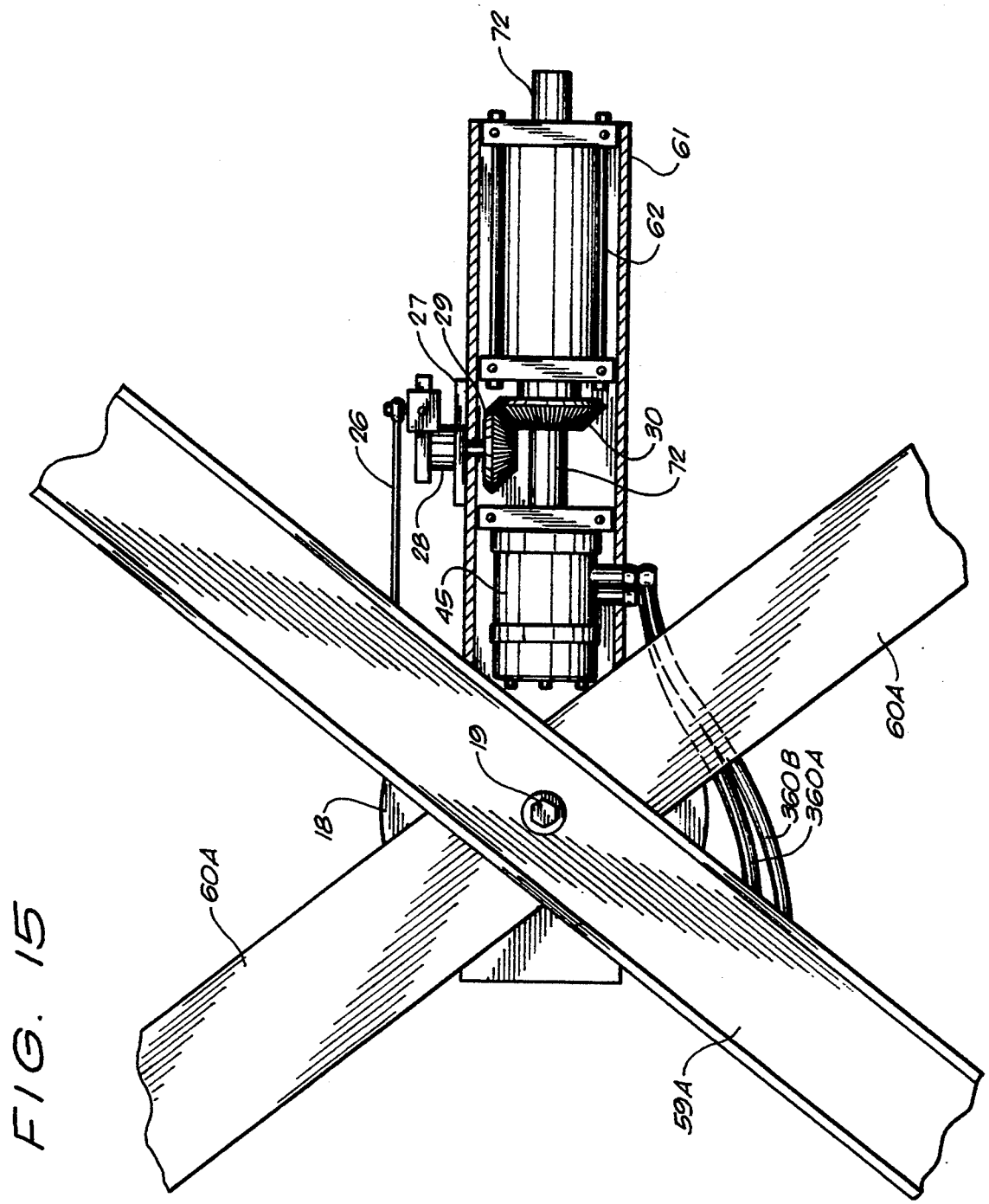
FIG. 15 depicts an enlarged partial cut-away view of a portion of the apparatus depicted in FIG. 5.

In accordance with the present invention, during a typical cleaning and stripping operation, referring specifically to FIGS. 13 and 15, there occurs a constant reciprocating motion orchestrated through drive push rod 26 depending from drive eccentric base 27 and associated eccentric adjust 28. Preferably, during the fixed mode of the present invention, air supply is held constant onto brake caliper 23, thereby preventing its motion. K-flame assembly 140 retracting into full spread position, as depicted in FIG. 8, will mechanically shift air supply mode valve 36 into the tracking mode, releasing air from brake caliper 23 and simultaneously redirecting air to air valve alternator 43 which senses the direction of motion of drive push rod 26, thereby alternately sending air to the appropriate caliper. As should be clear to those skilled in the art, this alternating air flow provides a pull-hold-pull-hold action. Similarly, by sending air through sequence reversing valve 35, the same alternating impulses from air alternator valve 43 are sent to the opposite caliper. This air flow effects a reversal of the direction of tracking from a pull-hold action to a hold-push action.

Referring now to FIGS. 12 and 15, in accordance with the present invention, sensing the direction of the motion of reciprocating push rod 26 is achieved by alternating air valve 43 in conjunction with resistor lever 34. The resistance force provided by lever 34 compels sliding rods 32 and 33 to engage the plunger of valve 43, one way under push mode and the opposite way under pull mode. As will be understood by those skilled in the art, the resistance of lever 34 cannot be spring-loaded, but must be applied by friction thereby providing uniform resistance at any position thereof. As will also be understood by those skilled in the art, this quantum of resistance should preferably only exceed the resistance inherent in the actuation of the said plunger of alternating air valve 43 under normal air pressure therein.

It should be apparent to those skilled in the art that a particular advantage of reciprocating drive 150 is the ability to track in the same direction independently of the direction of rotation. Obstructions which interfere with the current direction of rotation can be overcome by simply reversing the rotation, without disturbing the linear tracking of the present invention along the tank car floor. By applying a series of reversals of rotation, such obstruction can be conveniently circumvented and, of course, with the present invention simply tracking in the same direction. Thus, it is a feature of the present invention that by translating rotational motion to reciprocating motion, as hereinbefore described in detail, directional tracking in is inherently negatived; the push-pull behavior characterizing the present invention is independent of the direction rotation.

This synchronous relationship between rotation and tracking has been heretofore unknown in the tank car cleaning and stripping art. With conventional cleaning and stripping apparatus, unforeseen interference or cessation of nozzle rotation, has no affect upon tracking, because rotation and tracking are unsynchronized. Accordingly, under such adverse circumstances, an attendant must stop the apparatus' operation and back-up the apparatus due to ineffective cleaning or stripping which has transpired during the erratic rotation. On the other hand, in accordance with the present invention, when such anomaly with rotation occurs, changing the direction of rotation is typically sufficient remedial action. For example, during rubber-stripping occasionally rubber remnants hang down from the ceiling or accumulate on the floor of a tank car. It is observed in practice that a nozzle that is hung-up because of accumulation of debris or the like, is usually freed therefrom by a mere change in rotational direction. If, however, an obstruction is caused by a fixture inside a tank car, and particularly if the nozzle-surface distance must be sustained for effective cleaning and/or stripping, using the present invention, reversing the direction of rotation will at least partially free-up its nozzles, so that tracking will continue provided partial rotation achieves the length of the synchronized push or pull cycle, namely 180°.

It should be evident to those skilled in the art that partial tracking can nevertheless occur under the present invention even if rotation is less than 180°, depending upon the nozzle positions relative to the push rod. Furthermore, it is an advantage of the present invention that even if the nozzles cease rotation on both sides of such a fixture/obstacle, reversing direction of rotation sustains uniform cleaning and stripping in the vicinity thereof. Of course, once the present invention traverses the fixture/obstacle, normal single-directional rotation resumes. It is another advantage of the present invention that its synchronized rotation-tracking relationship uniquely requires tracking to await (reversal of) rotation whenever interference or cessation of rotation occurs.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. In a tank car having a plurality of interior surfaces including a floor, side walls, end walls and a ceiling having a manway for access of a worker thereinto, a cleaning and stripping apparatus comprising:
    a X-frame assembly having a swivel support assembly rotatably attached thereto;
    said X-frame assembly configured to be insertable into said manway when arranged in a compressed position and further configured to receive a plurality of pneumatic tire assemblies and to support a K-frame assembly when said X-frame assembly is arranged in an extended position;
    said K-frame assembly releasably and rotatably attached to said swivel support assembly and having swivel means;
    fluid supply conduit means connected to said swivel support assembly for operating hydraulic motor means for rotating said swivel means;
    spray means fixedly attached to said swivel means for forming a fluid spray pattern upon said plurality of interior surfaces of said tank car; and
    air supply conduit means connected to a plurality of air cylinder means hingedly connected to said X-frame assembly for pneumatically controlling said compressed or extended configuration of said X-frame assembly, connected to drive means for pneumatically controlling linear movement of said X-frame assembly independently of movement of said rotation of said swivel means and for synchronizing said rotational movement of said swivel means with said linear movement of said X-frame assembly.

2. The cleaning and stripping apparatus recited in claim 1, wherein:
    said plurality of pneumatic tire assemblies comprises: corresponding first and second pneumatic tire drive assemblies and corresponding first and second pneumatic tire stabilizer assemblies.

3. The cleaning and stripping apparatus recited in claim 2, wherein:
    said X-frame assembly comprises:
        a first X-member fixedly attached to a second X-member by an axle disposed therebetween.

4. The cleaning and stripping apparatus recited in claim 3, wherein:
    said first X-member comprises:
        a first fiat frame member pivotally attached by said axle to a first channel frame member and longitudinally juxtaposed therewith; and
    said second X-member comprises:
        a second fiat frame member pivotally attached by said axle to a second channel frame member and longitudinally juxtaposed therewith.

5. The cleaning and stripping apparatus recited in claim 4, wherein:
    said X-frame assembly further comprises:
        a first sleeve member fixedly attached to said first X-member and to said second X-member;
        a second sleeve member fixedly attached to said second X-member and to said first X-member;
        a first sprocketed sleeve member fixedly attached to said first X-member and to said said second X-member, and disposed oppositely of said first sleeve member;
        a second sprocketed sleeve member fixedly attached to said second X-member and to said second X-member, and disposed oppositely of said second sleeve member;
        first sprocket means disposed concentrically of said first sprocketed sleeve member for receiving roller chain means; and
        second sprocket means disposed concentrically of said second sprocketed sleeve member for receiving said roller chain means.

6. The cleaning and stripping apparatus recited in claim 5, wherein:
    said X-frame assembly further comprises:
        said first X-member and said second X-member pivotally attached at their longitudinal midpoints by a shaft disposed perpendicularly of each of said first and second X-member.

7. The cleaning and stripping apparatus recited in claim 6, wherein:
    said first pneumatic tire drive assembly is configured to be insertably received by said first sprocketed sleeve member and said second pneumatic tire drive assembly is configured to be insertably received by said second sprocketed sleeve member.

8. The cleaning and stripping apparatus recited in claim 7, wherein:
    said first pneumatic tire stabilizer assembly is configured to be insertably received by said first sleeve member and said second pneumatic tire stabilizer assembly is configured to be insertably received by said second sleeve member.

9. The cleaning and stripping apparatus recited in claim 8, wherein:
    said swivel means comprises:
        a plurality of arm means which varies from a first, compressed configuration for cleaning and stripping said end walls to a second, extended configuration for cleaning and stripping said side walls, with each said compressed and extended position, or any intermediate position, responsive to actuator means disposed on said K-frame assembly.

10. The cleaning and stripping apparatus recited in claim 9, wherein:
said drive means comprises:
clutch means for engaging said actuator means during said cleaning and stripping of said end walls and for disengaging said actuator means thereafter; and
pneumatic caliper means which is activated responsive to stud disengagement of said clutch means, for causing said linear movement of said X-frame assembly and said rotational movement of said spray means, for cleaning and stripping said side walls, ceiling and floor.

11. The cleaning and stripping apparatus recited in claim 10, wherein:
said swivel support assembly comprises:
packing means disposed circumferentially of high pressure fluid received therein from said fluid supply conduit means, for withstanding forces generated by said high pressure fluid.

12. In a tank car having a plurality of interior surfaces including a floor, side walls, end walls and a ceiling having a manway for access of a worker thereinto, a cleaning and stripping apparatus comprising:
a X-frame assembly comprising:
a first X-member fixedly attached to a second X-member by an axle disposed therebetween, and having a swivel support assembly rotatably attached thereto;
a first sleeve member fixedly attached to said first X-member and to said second X-member;
a second sleeve member fixedly attached to said second X-member and to said first X-member;
a first sprocketed sleeve member fixedly attached to said first X-member and to said said second X-member, and disposed oppositely of said first sleeve member;
a second sprocketed sleeve member fixedly attached to said second X-member and to said second X-member, and disposed oppositely of said second sleeve member;
first sprocket means disposed concentrically of said first sprocketed sleeve member for receiving roller chain means; and
second sprocket means disposed concentrically of said second sprocketed sleeve member for receiving said roller chain means;
said first X-member and said second X-member pivotally attached at their longitudinal midpoints by a shaft disposed perpendicularly of each of said first and second X-member;
said X-flame assembly configured to be insertable into said manway when arranged in a compressed position and further configured to receive a plurality of pneumatic tire assemblies and to support a K-flame assembly when said X-frame assembly is arranged in an extended position;
said K-flame assembly releasably and rotatably attached to said swivel support assembly and having swivel means;
fluid supply conduit means connected to said swivel support assembly operating hydraulic motor means for rotating said swivel means;
spray means fixedly attached to said swivel means for forming a fluid spray pattern upon said plurality of interior surfaces of said tank car; and
air supply conduit means connected to a plurality of air cylinder means hingedly connected to said X-frame assembly for pneumatically controlling said compressed or extended configuration of said X-frame assembly, connected to drive means for pneumatically controlling linear movement of said X-frame assembly independently of movement of said rotation of said swivel means and for synchronizing said rotational movement of said swivel means with said linear movement of said X-frame assembly.

13. The cleaning and stripping apparatus recited in claim 12, wherein:
said first X-member comprises:
a first fiat frame member pivotally attached by said axle to a first channel frame member and longitudinally juxtaposed therewith; and
said second X-member comprises:
a second fiat frame member pivotally attached by said axle to a second channel frame member and longitudinally juxtaposed therewith.

14. The cleaning and stripping apparatus recited in claim 13, wherein:
said first pneumatic tire drive assembly is configured to be insertably received by said first sprocketed sleeve member and said second pneumatic tire drive assembly is configured to be insertably received by said second sprocketed sleeve member.

15. The cleaning and stripping apparatus recited in claim 14, wherein:
said first pneumatic tire stabilizer assembly is configured to be insertably received by said first sleeve member and said second pneumatic tire stabilizer assembly is configured to be insertably received by said second sleeve member.

16. The cleaning and stripping apparatus recited in claim 15, wherein:
said drive means comprises:
clutch means for engaging said actuator means during said cleaning and stripping of said end walls and for disengaging said actuator means thereafter; and
pneumatic caliper means which is activated responsive to said disengagement of said clutch means, for causing said linear movement of said X-frame assembly and said rotational movement of said spray means, for cleaning and stripping said side walls, ceiling and floor.

17. The cleaning and stripping apparatus recited in claim 16, wherein:
said swivel support assembly comprises:
packing means disposed circumferentially of high pressure fluid received therein from said fluid supply conduit means, for withstanding forces generated by said high pressure fluid.

18. A method for cleaning and stripping a plurality of interior surfaces of a tank car, including a floor, a pair of side walls, a pair of end walls and a ceiling, said tank car having a manway for access of a worker thereinto, said method comprising the steps of:
inserting a compressed X-frame assembly having a swivel support assembly rotatably attached thereto into said manway;
affixing the axles of four corresponding pneumatic tire drive assemblies to said X-frame assembly;

positioning said pneumatic tire drive assemblies on said floor of said tank car;

further affixing the axles of four corresponding pneumatic tire stabilizing assemblies to said X-frame assembly;

connecting air conduits to a pair of air cylinders hingedly attached to said X-frame assembly;

pneumatically configuring said X-frame assembly so that said pneumatic tire drive assemblies contact said floor of said tank car and said pneumatic tire stabilizer assemblies simultaneously contact said ceiling thereof;

pivoting said swivel support assembly from a position substantially perpendicular of said floor of said tank car to a position substantially parallel to said floor and pointed toward one of said pair of end walls;

further inserting an extended K-frame assembly having swivel means into said manway;

attaching said K-frame assembly to said swivel support assembly;

further connecting fluid conduits to said swivel support assembly, communicating fluid to spray means contained in said swivel means and for operating a hydraulic pump contained in said swivel support assembly;

further positioning said spray means proximal to said one of said pair of end walls;

initiating fluid flow through said fluid conduits, for activating said hydraulic pump and said spray means;

engaging clutch means contained in said swivel support assembly, for cleaning and stripping said one of said pair of end walls;

holding said X-frame assembly in position with said spray means proximal to said one of said pair of end walls;

disengaging said clutch means and releasing said X-frame assembly, for cleaning and stripping said pair of side walls, said ceiling and said floor of substantially a longitudinal half of said tank car;

driving said pair of pneumatic tire drive assemblies linearly and longitudinally along said floor of said tank car and synchronizing simultaneous rotating of said swivel means for producing a spiral spray pattern from said spray means;

detaching said K-frame assembly from said swivel support assembly;

further pivoting said swivel support assembly through substantially 180° maintaining its position substantially parallel to said floor and pointed toward the opposite one of said pair of end walls; and repeating said attaching, engaging and disengaging steps for cleaning and stripping said plurality of interior surfaces of substantially the remaining longitudinal half of said tank car.

* * * * *